(12) United States Patent
Jang

(10) Patent No.: US 6,391,462 B1
(45) Date of Patent: May 21, 2002

(54) OPTICAL FILTER FOR PLASMA DISPLAY

(75) Inventor: Tae-woong Jang, Cheonan (KR)

(73) Assignee: Samsung SDI. Co., Ltd., Kyungki-do (KR)

( * ) Notice: Subject to any disclaimer, the term of this patent is extended or adjusted under 35 U.S.C. 154(b) by 0 days.

(21) Appl. No.: 09/630,958

(22) Filed: Aug. 2, 2000

(30) Foreign Application Priority Data

Aug. 6, 1999 (KR) .............................................. 99-32307

(51) Int. Cl.$^7$ ................................................. B32B 17/06
(52) U.S. Cl. ........................ 428/432; 428/216; 428/412; 428/433; 428/434; 428/450; 428/469; 428/472; 428/697; 428/699; 428/701; 428/702; 359/359; 359/585
(58) Field of Search ................................. 359/359, 585; 428/432, 433, 434, 450, 469, 472, 697, 699, 701, 702, 412, 216

(56) References Cited

U.S. PATENT DOCUMENTS

| | | | |
|---|---|---|---|
| 4,985,312 A | * | 1/1991 | Furuya et al. |
| 5,763,063 A | * | 6/1998 | Pass et al. |
| 5,834,103 A | * | 11/1998 | Bond et al. |
| 6,123,986 A | * | 9/2000 | Maschwitz et al. |

FOREIGN PATENT DOCUMENTS

WO 93/20256 * 10/1993 ............ C23C/14/14

* cited by examiner

*Primary Examiner*—Deborah Jones
*Assistant Examiner*—Jennifer McNeil
(74) *Attorney, Agent, or Firm*—Lowe Hauptman Gilman & Berner, LLP

(57) ABSTRACT

An optical filter for plasma displays, including: a transparent substrate; a first transparent dielectric layer formed on the transparent substrate with at least one metal oxide selected from the group consisting of titanium dioxide ($TiO_2$), zinc oxide (ZnO), indium oxide ($In_2O_3$), tin oxide ($SnO_2$) and cadmium oxide (CdO), or materials obtained by doping the metal oxides with at least one metal selected from the group consisting of indium (In), gallium (Ga), aluminum (Al), tin (Sn) and antimony (Sb); a silver (Ag) layer formed on the first transparent dielectric layer; a metal silver-diffusion barrier layer formed on the silver layer, for suppressing diffusion of silver into the overlaying layer; and a second transparent dielectric layer formed on the metal silver-diffusion barrier layer with at least one metal oxide selected from the group consisting of titanium dioxide ($TiO_2$), zinc oxide (ZnO), indium oxide ($In_2O_3$), tin oxide ($SnO_2$) and cadmium oxide (CdO), or materials obtained by doping the metal oxides with at least one metal selected from the group consisting of indium (In), gallium (Ga), aluminum (Al), tin (Sn) and antimony (Sb). The optical filter has a higher transmittance at the blue visible light wavelength than at the red and green light wavelength, and thus a decrease in luminance of the blue phosphor can be compensated for. Also, the optical filter according to the present invention is capable of shielding UV and IR wavelengths, and particularly, near-IR wavelength, and has antireflective functions. Thus, additional antireflection layer and near-IR shield are not required. The increase in transmittance at the visible light wavelength enhances the contrast characteristic and shows good electromagnetic wave shielding performance.

17 Claims, 5 Drawing Sheets

OPTICAL FILTER FOR PLASMA DISPLAY

BACKGROUND OF THE INVENTION

1. Field of the Invention

The present invention relates to an optical filter for plasma displays, and more particularly, to an optical filter for a plasma display with superior transmittance and reflectivity characteristics.

2. Description of the Related Art

Plasma displays, which generate the visual image by discharging a gas plasma, have been attractive as a substitute for cathode ray tubes (CRTs) due to good display performance thereof, in terms of display capacity, luminance, contrast, reflection image and viewing angle. In plasma displays, application of a direct or current voltage between electrodes creates a discharge of gas plasma therein, resulting in the emission of ultraviolet (UV) light from the gas plasma. The UV emission, in turn, excites adjacent phosphor materials resulting in electromagnetic emission of visual light.

FIG. 1 is an exploded perspective view of the configuration of a common plasma display, and FIG. 2 is an exploded perspective view of a part of the panel assembly in FIG. 1.

Referring to FIG. 1, the plasma display device includes a case 11, a cover 15 of the case 11, and a driving circuit board 12, a panel assembly 13 and an optical filter 14, which are accommodated in the case 11. The panel assembly 13 has a configuration shown in FIG. 2. Referring to FIG. 2, a series of first electrodes 23a as transparent display electrodes, a series of second electrodes 23b as address electrodes, are arranged between a front glass substrate 21, and a rear glass substrate 22. The first electrodes 23a and the second electrodes 23b are formed on the opposed inner surfaces of the front glass substrate 21 and the rear glass substrate 22, respectively, perpendicular to each other. A dielectric layer 24' is formed over the second electrodes 23b on the rear glass substrate 22 and a series of barrier walls 27 are formed on the dielectric layer 24' to define cells 29 therebetween. The cells 29 are filled with an inert gas such as argon (Ar). Also, a phosphor 28 is deposited on a predetermined region between the barrier walls 27, i.e., on a predetermined region of the cells 29. A dielectric layer 24 is formed over the first electrodes 23a and a protective layer 25 is formed thereon.

The driving circuit board 12 of FIG. 1 includes a variety of electronic parts for applying a voltage to the panel assembly 12 to drive the first and second electrodes 23a and 23b formed therein, thereby electrically controlling the overall display operation. The optical filter 14 disposed in front of the panel assembly 13 protects the viewer from electromagnetic waves generated by the panel assembly 13 and prevents a reflection of ambient light. FIG. 3 shows the intersection of the optical filter 14.

Referring to FIG. 3, the known optical filter in the art includes a transparent substrate 31, an antireflective layer 32 on the front surface of the transparent substrate 31, for preventing ambient light reflections, and an electromagnetic wave shield 30 on the rear surface thereof.

The antireflective layer 32 is formed of a material, for example, silicon oxide or titanium dioxide, and the electromagnetic wave shield 30 is formed of a material having superior conductivity, for example, silver (Ag). The electromagnetic wave shield 30 is grounded through the cover 15 and to the case 11. In other words, the electromagnetic waves from the panel assembly 13 are shielded by the electromagnetic shield 30 and grounded through the cover 15 and to the case 11 before they reach the viewer. For this purpose, the electromagnetic wave shield 30 of the optical filter 14 is electrically connected to the cover 15 and the case 11.

However, the conventional optical filter has the following-disadvantages. Since the reflectivity of the silver layer used as an electromagnetic wave shield is slightly high as a level of 10%, an antireflective layer is further required. In addition, since the optical filter cannot almost shield infrared (IR) light radiated from the panel assembly, an IR shield (not shown) must be interposed between the electromagnetic wave shield and the panel assembly, which avoids a misoperation of the display adopting the optical filter. Also, the optical filter reduces visible light transmittance and in turn contrast characteristic. Poor luminance characteristic of blue phosphor, relative to that of red and green phosphors, increases a need for color correction in the blue visible wavelength range.

SUMMARY OF THE INVENTION

It is an objective of the present invention is to provide an optical filter for plasma displays with antireflective properties and effective electromagnetic wave and infrared (IR) light shielding effects, in which a decrease in reflectivity in the visible wavelength range enhances a contrast characteristic and assures color correction in the blue visible wavelength range.

To achieve the above objective, the present invention provides an optical filter for a plasma display comprising: a transparent substrate; a first transparent dielectric layer formed on the transparent substrate with at least one metal oxide selected from the group consisting of titanium dioxide ($TiO_2$), zinc oxide (ZnO), indium oxide ($In_2O_3$), tin oxide ($SnO_2$) and cadmium oxide (CdO), or materials obtained by doping the metal oxides with at least one metal selected from the group consisting of indium (In), gallium (Ga), aluminum (Al), tin (Sn) and antimony (Sb); a silver (Ag) layer formed on the first transparent dielectric layer; a metal silver-diffusion barrier layer formed on the silver layer, for suppressing diffusion of silver into the overlaying layer; and a second transparent dielectric layer formed on the metal silver-diffusion barrier layer with at least one metal oxide selected from the group consisting of titanium dioxide ($TiO_2$), zinc oxide (ZnO), indium oxide ($In_2O_3$), tin oxide ($SnO_2$) and cadmium oxide (CdO), or materials obtained by doping the metal oxides with at least one metal selected from the group consisting of indium (In), gallium (Ga), aluminum (Al), tin (Sn) and antimony (Sb).

BRIEF DESCRIPTION OF THE DRAWINGS

The above object and advantages of the present invention will become more apparent by describing in detail preferred embodiments thereof with reference to the attached drawings in which.

DESCRIPTION OF THE PREFERRED EMBODIMENTS

The optical filter according to the present invention may include a stack of a silver layer, a metal silver-diffusion barrier layer and a third transparent dielectric layer, or a stack of a silver layer, a metal silver-diffusion barrier layer, a third transparent dielectric layer, a silver layer, a metal silver-diffusion barrier layer and a fourth transparent dielectric layer, on the second transparent dielectric layer. Preferably, the metal silver-diffusion barrier layer is formed of at least one of copper (Cu) and titanium (Ti).

Figure 1:
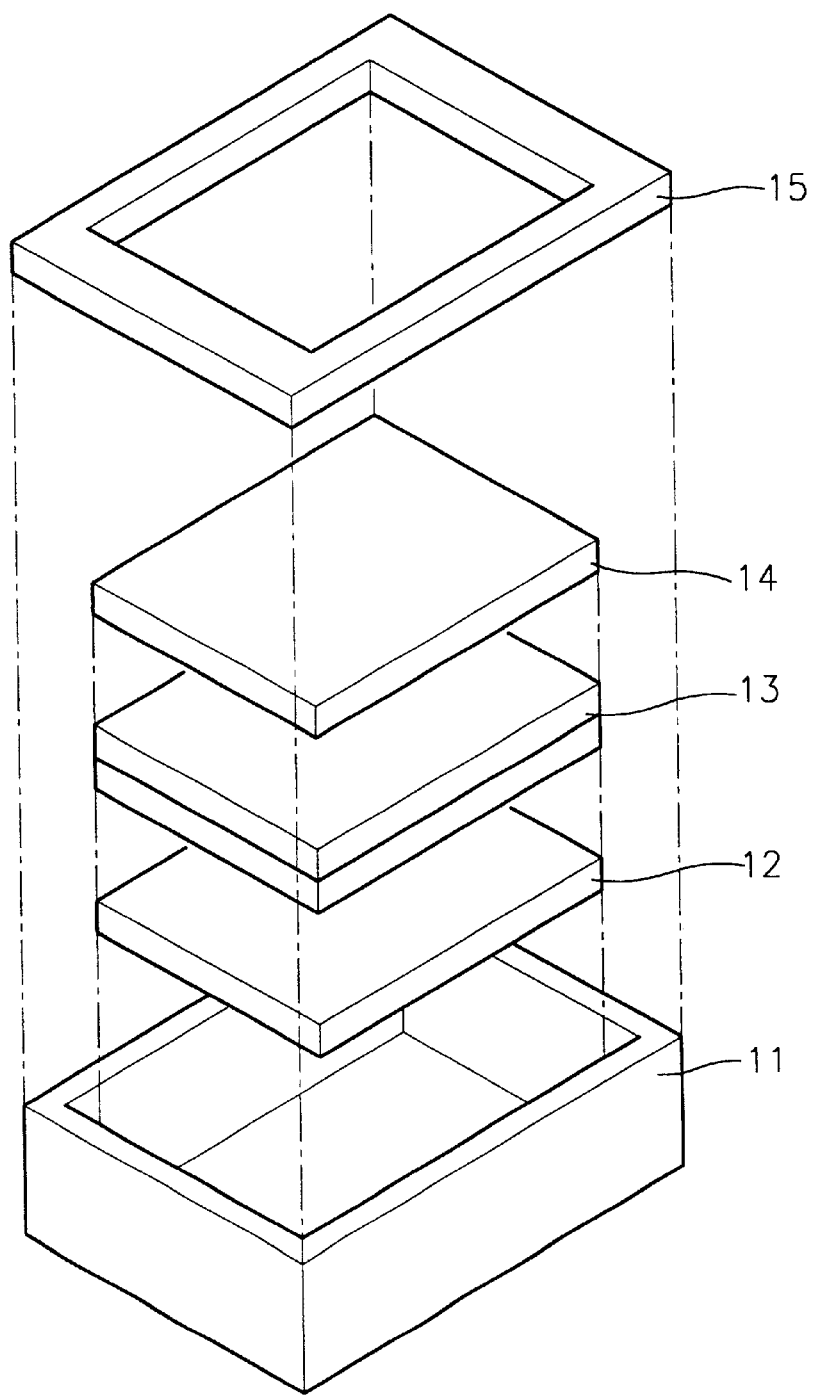
FIG. 1 is an exploded perspective view of the configuration of a common plasma display.
Figure 2:
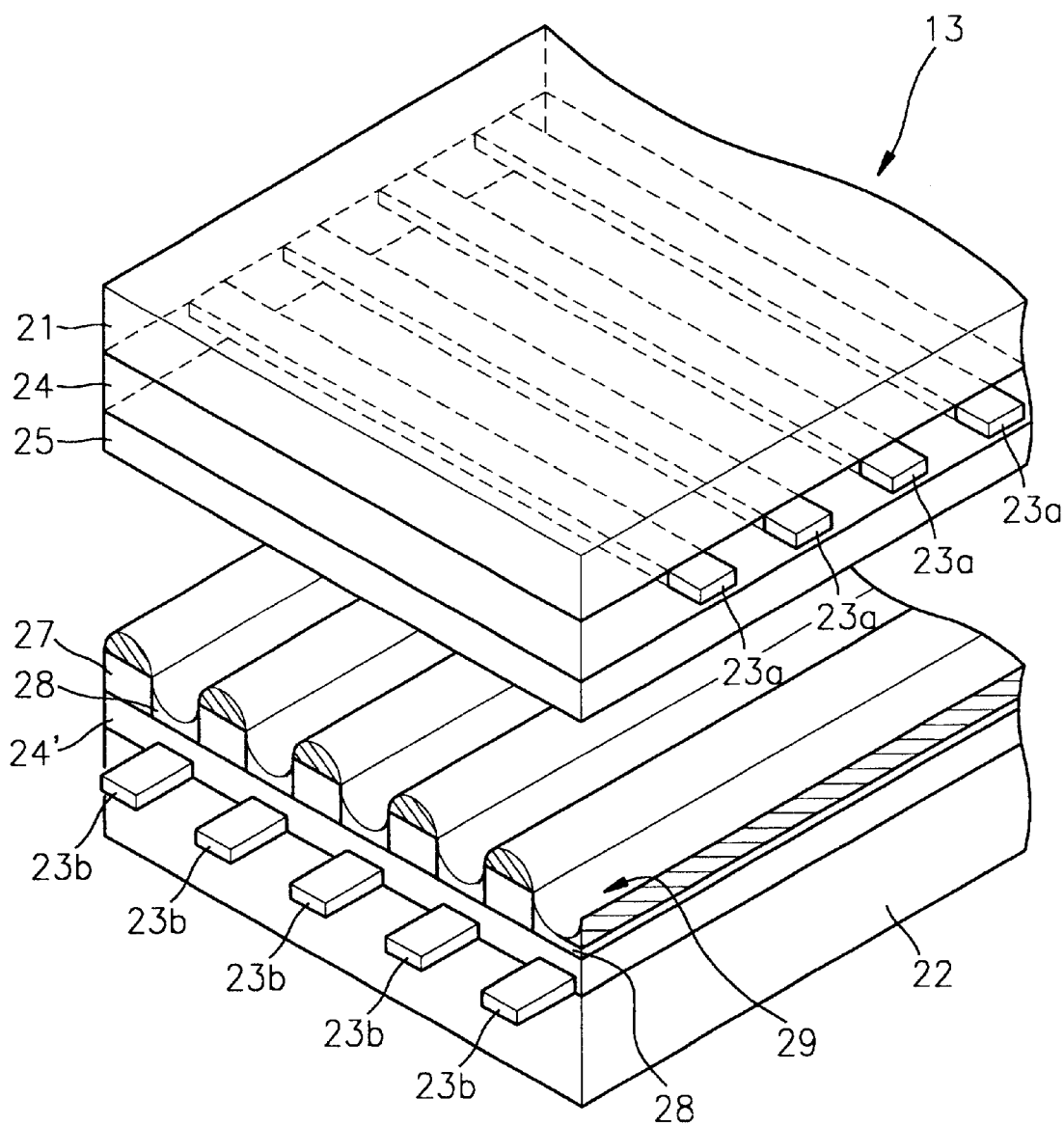
FIG. 2 is an exploded perspective view of a part of the panel assembly in FIG. 1.
Figure 3:
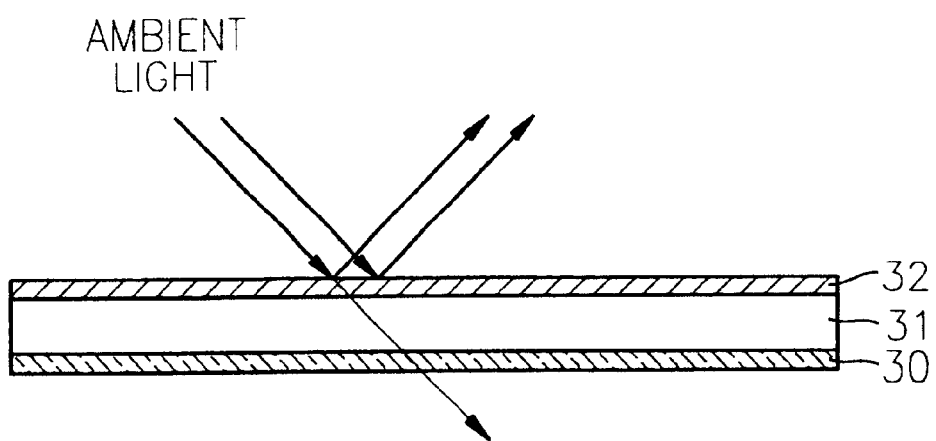
FIG. 3 is a sectional view of a conventional optical filter.
Figure 4:
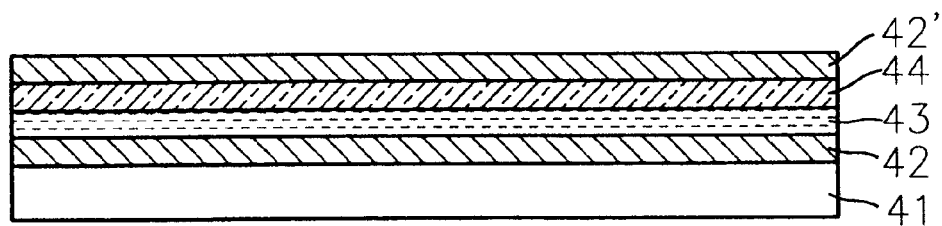
FIGS. 4 to 6 are sectional views of an optical filter according to the present invention.

The optical filter according to the present invention has the configuration shown in FIG. 4. Referring to FIG. 4, a first transparent dielectric layer 42 is formed on a transparent substrate 41, and a silver layer 43, a metal silver-diffusion barrier layer 44 and a second transparent dielectric layer 42' are sequentially formed on the first transparent dielectric layer 42. The first transparent dielectric layer 42 is formed of at least one metal oxide selected from the group consisting of $TiO_2$, ZnO and ITO layer, or materials obtained by doping these metal oxides with a metal such as In, Ga, Al, Sn or Sb. The metal silver-diffusion barrier layer 44 is formed of Cu, Ti or mixtures thereof. The metal silver-diffusion-barrier layer 44 prevents diffusion of silver into the overlying layer and has a color correcting function in the blue visible wavelength range.

The thickness of the silver layer 43 may be in the range of 30 to 500 Å. If the thickness of the silver layer 43 is less than 30 Å, resistance and near-IR shielding effects are lowered. If the thickness of the silver layer 43 is greater than 500 Å, unacceptably the transmittance decreases while the reflectivity increases. Preferably, the thickness of the metal silver-diffusion barrier layer 44 is in the range of 10 to 100 Å. If the thickness of the metal silver-diffusion barrier layer 44 is not within the above range, the transmittance characteristic is not acceptable.

Similar to the first transparent dielectric layer 42, the second transparent dielectric layer 42', the outermost layer, is formed of at least one metal oxide selected from the group consisting of $TiO_2$, ZnO and ITO, or materials obtained by doping these metal oxides with a metal such as In, Ga, Al, Sn or Sb. However, the use of $TiO_2$ is preferred due to a high refractive index of 2.3487 and strong hardness.

The transparent substrate 41 is formed of any transparent material, for example, glass or acryl resin.

Figure 5:
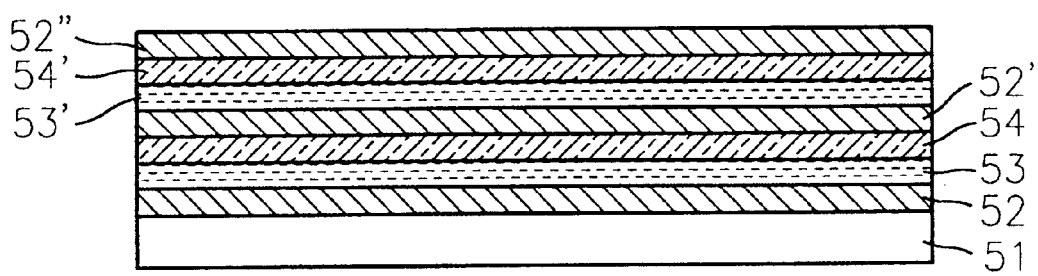
Figure 6:
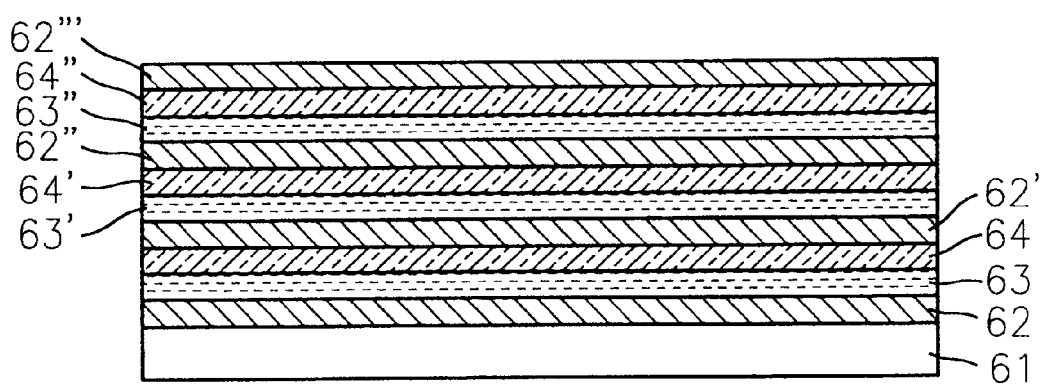

Modifications of the optical filter according to the present invention are shown in FIGS. 5 and 6. Referring to FIG. 5, a modification of the optical filter further includes a silver layer 53', a silver-diffusion barrier layer 54' and a third transparent dielectric layer 52" in sequence on the second transparent dielectric layer 52' of FIG. 4. Referring to FIG. 6, another modification of the optical filter further includes a silver layer 63", a silver-diffusion barrier layer 64" and a fourth transparent dielectric layer 62'" on the third transparent dielectric layer 62" of the optical filter shown in FIG. 5.

The optical filters according to the present invention, shown in FIGS. 4 through 6, show superior transmittance and reflectivity characteristics. The optical filters can effectively shield UV and IR wavelengths, and particularly, near-IR wavelength, and inherently have antireflective properties. Also, the optical filters provides a good electromagnetic wave shielding effect. For these reasons, the optical filters require no additional antireflective layer or IR shield film. Also, the use of a copper layer as the silver-diffusion barrier layer increases the blue visible light transmittance, rather than green and red visible light transmittance, so that a decrease in luminance of blue phosphor can be compensated for. In addition, a higher visible light transmittance results in contrast enhancement.

The present invention will be described in greater detail by means of the following examples. The following examples are for illustrative purposes and not intended to limit the scope of the invention.

EXAMPLE 1

A $TiO_2$ layer was deposited on a glass substrate to have a thickness of 300 Å, and a Ag layer was formed thereon to have a thickness of 100 Å. After a Cu layer was formed on the Ag layer to have a thickness of 30 Å, a $TiO_2$ layer was formed thereon to have a thickness of 550 Å.

Then, a Ag layer was formed to have a thickness of 12 Å on the $TiO_2$ layer, and a Ti layer having a thickness of 30 Å and a $TiO_2$ layer having a thickness of 600 Å were sequentially formed on the Ag layer. After a Cu layer was formed on the Ag layer to have a thickness of 30 Å, a $TiO_2$ layer having a thickness of 300 Å was formed thereon, resulting in an optical filter for a plasma display.

Refractive index and extinction coefficient were measured for each layer of the optical filter. The result is shown in Table 1. The refractive index and extinction coefficient of air are also shown in Table 1 as a reference.

TABLE 1

| Layers | Refractive index | Extinction coefficient |
|---|---|---|
| Air | 1.0000 | 0.0000000 |
| $TiO_2$ | 2.3487 | 0.0003743 |
| Cu | 0.8380 | 2.6725000 |
| Ag | 0.0510 | 2.9600000 |
| $TiO_2$ | 2.3487 | 0.0003743 |
| Ti | 2.3696 | 3.1729090 |
| Ag | 0.0510 | 2.9600000 |
| $TiO_2$ | 2.3487 | 0.0003743 |
| Cu | 0.8380 | 2.6725000 |
| Ag | 0.0510 | 2.9600000 |
| $TiO_2$ | 2.3487 | 0.0003743 |
| Glass substrate | 1.5209 | 0.0000000 |

EXAMPLE 2

The process of Example 1 was followed except that ZnO layers were formed instead of the $TiO_2$ layers, to give a completed optical filter for a plasma display device.

EXAMPLE 3

The process of Example 1 was followed except that $In_2O_3$ layers were formed instead of the $TiO_2$ layers, to give a completed optical filter for a plasma display device.

Figure 7:
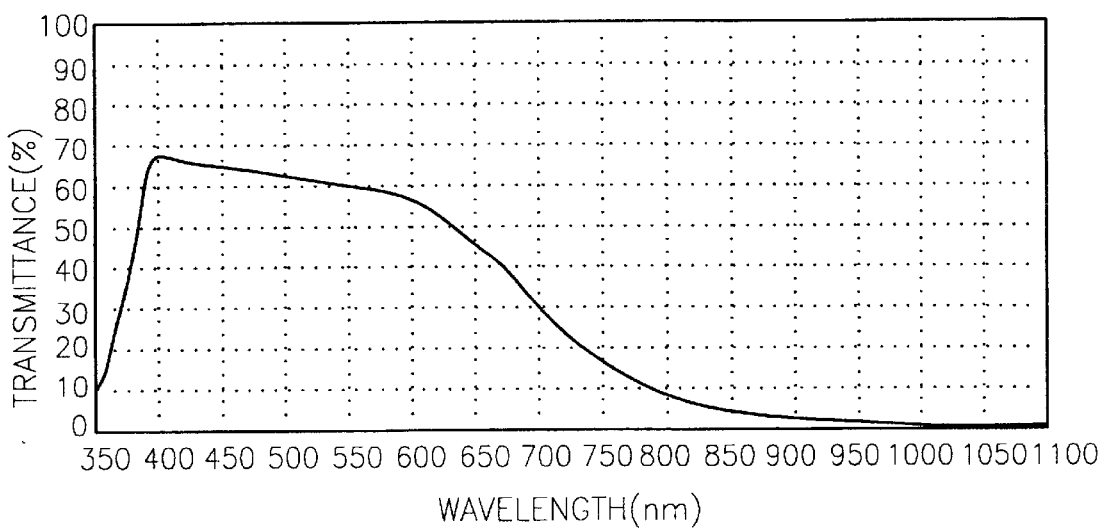
FIG. 7 shows the transmittance characteristic with respect to wavelength in a plasma display adopting the optical filter of Example 1.
Figure 8:
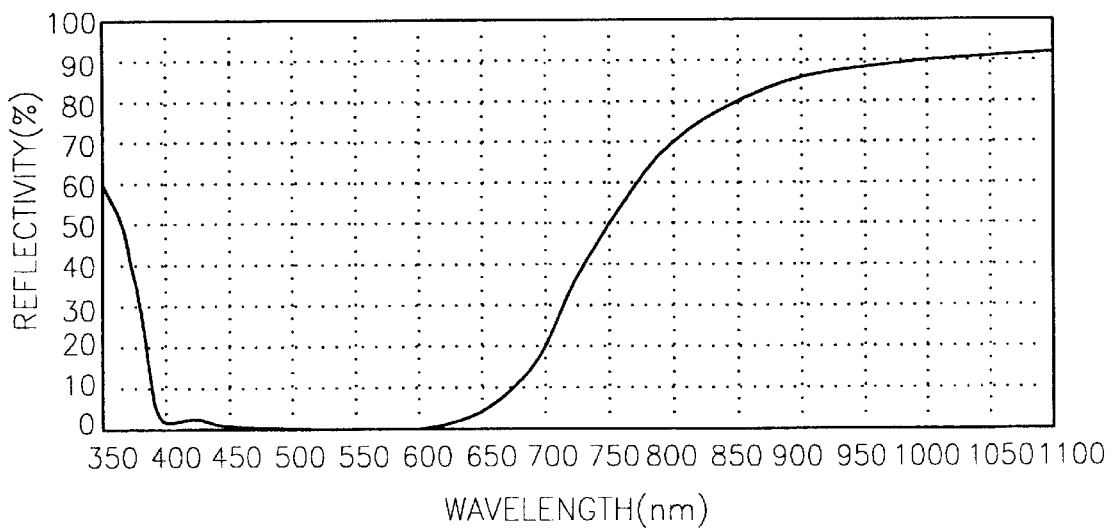
FIG. 8 shows the reflectivity characteristic with respect to wavelength in the plasma display adopting the optical filter of Example 1.

Also, transmittance and reflectivity characteristics of a plasma display adopting the optical filter obtained in Example 1 with respect to wavelength were measured. The results are shown in FIGS. 7 and 8.

While the transmittance in the visible light wavelength is 60%, the light in the UV and IR wavelengths is shield at a transmittance of 10% or less. Also, the transmittance in the near infrared wavelength, i.e., 850 nm, is as low as 5% or less, which means the optical filter according to the present invention effectively shield the near-IR generated from the panel assembly of a display. FIG. 8 shows that the optical filter according to the present invention inherently has antireflective properties with respect to the visible light. Thus, it can be ascertained that the optical filter according to the present invention needs no additional antireflective layer.

Surface resistance values were measured for plasma display panels adopting the optical filters obtained in Examples 1 through 3. As a result, the surface resistance value for the optical filters were about 0.45 Ω/□, which is very close to the electromagnetic wave shield requirement of 3 Ω/□ for display panels. This result supports that the optical filters according to the present invention has superior electromagnetic wave shielding performance.

In addition, contrast characteristics in light room at the visible light wavelength were measured for the plasma displays adopting the optical filters obtained in Examples 1 through 3. The contrast characteristics in light room are expressed by {peak luminance+peak reflection luminance in dark room}/{background luminance+background reflection luminance in dark room}. As a result, the optical filters of the present invention show enhanced contract characteristics which are the same as those of conventional optical filters.

The optical filter according to the present invention has a higher transmittance at the blue visible light wavelength than at the red and green light wavelength, and thus a decrease in luminance of the blue phosphor can be compensated for. Also, the optical filter according to the present invention is capable of shielding UV and IR wavelengths, and particularly, near-IR wavelength, and has antireflective functions. Thus, additional antireflection layer and near-IR shield are not required. The increase in transmittance at the visible light wavelength enhances the contrast characteristic and shows good electromagnetic wave shielding performance.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. An optical filter for a plasma display comprising:
   a transparent substrate;
   a first transparent dielectric layer formed on the transparent substrate with at least one metal oxide selected from the group consisting of titanium oxide ($TiO_2$), zinc oxide (ZnO), indium oxide ($In_2O_3$), tin oxide ($SnO_2$) and cadmium oxide (CdO), or material obtained by doping the metal oxides with at least one metals selected from the group consisting of indium (In), gallium (Ga), aluminum (Al), tin (Sn) and antimony (Sb);
   a silver (Ag) layer formed on the first transparent dielectric layer;
   a metal silver-diffusion barrier layer made of copper (Cu) formed on the silver layer, for suppressing diffusion of silver into the overlaying layer; and
   a second transparent dielectric layer formed on the metal silver-diffusion barrier layer with at least one metal oxide selected from the group consisting of titanium oxide ($TiO_2$), zinc oxide (ZnO), indium oxide ($In_2O_3$), tin oxide ($SnO_2$) and cadmium oxide (CdO), or material obtained by doping the metal oxides with at least one metals selected from the group consisting of indium (In), gallium (Ga), aluminum (Al), tin (Sn) and antimony (Sb).

2. The optical filter of claim 1, wherein a stack of a silver layer, a metal silver-diffusion barrier layer and a third transparent dielectric layer, or a stack of a silver layer, a metal silver-diffusion barrier layer, a third transparent dielectric layer, a silver layer, a metal silver-diffusion barrier layer and a fourth transparent dielectric layer, is further laid down on the second transparent dielectric layer.

3. The optical filter of claim 2, wherein the thickness of the silver layer is in the range of 30 to 500 Å.

4. The optical filter of claim 2, wherein the thickness of the metal silver-diffusion barrier layer is in the range of 10 to 100 Å.

5. The optical filter of claim 1, wherein the thickness of the silver layer is in the range of 30 to 500 Å.

6. The optical filter of claim 1, wherein the thickness of the metal silver-diffusion barrier layer is in the range of 10 to 100 Å.

7. A display device having an optical filter for shielding electromagnetic radiation and preventing ambient light reflection, said optical filter comprising:
   a transparent substrate;
   a first transparent dielectric layer formed on the transparent substrate with at least one metal oxide selected from the group consisting of titanium oxide (TiO2), zinc oxide (ZnO), indium oxide (In2O3), tin oxide (SnO2) and cadmium oxide (CdO), or materials obtained by doping the metal oxides with at least one metals selected from the group consisting of indium (In), gallium (Ga), aluminum (Al), tin (Sn) and antimony (Sb);
   a silver (Ag) layer formed on the first transparent dielectric layer;
   a metal silver-diffusion barrier layer made of copper and immediately formed on the silver layer, for suppressing diffusion of silver into the overlaying layer, and
   a second transparent dielectric layer formed on the metal silver-diffusion barrier layer with at least one metal oxide selected from the group consisting of titanium oxide (TiO2), zinc oxide (ZnO), indium oxide (In2O3), tin oxide (SnO2) and cadmium oxide (CdO), or material obtained by doping the metal oxides with at least one metals selected from the group consisting of indium (In), gallium (Ga), aluminum (Al), tin (Sn) and antimony (Sb);
   wherein the silver layer is electrically grounded.

8. The display device of claim 7, wherein the optical filter further comprises a stack of a silver layer, a metal silver-diffusion barrier layer and a third transparent dielectric layer, or a stack of a silver layer, a metal silver-diffusion barrier layer, a third transparent dielectric layer, a silver layer, a metal silver-diffusion barrier layer and a fourth transparent dielectric layer, is further laid down on the second transparent dielectric layer.

9. The display device of claim 8, wherein the metal silver-diffusion barrier layer is formed of at least one of copper (Cu) and titanium (Ti).

10. The display device of claim 8, wherein the thickness of the silver layer is in the range of 30 to 500 Å.

11. The display device of claim 8, wherein the thickness of the metal silver-diffusion barrier layer is in the range of 10 to 100 Å.

12. The display device of claim 7, wherein the metal silver-diffusion barrier layer is formed of at least one of copper (Cu) and titanium (Ti).

13. The display device of claim 7, wherein the thickness of the silver layer is in the range of 30 to 500 Å.

14. The display device of claim 7, wherein the thickness of the metal silver-diffusion barrier layer is in the range of 10 to 100 Å.

15. An optical filter for a plasma display, comprising:
   a transparent substrate;

a first stack having
- a first transparent dielectric layer formed on the transparent substrate with at least one metal oxide selected from the group consisting of titanium oxide ($TiO_2$), zinc oxide (ZnO), indium oxide ($In_2O_3$), tin oxide ($SnO_2$) and cadmium oxide (CdO), or material obtained by doping the metal oxides with at least one metals selected from the group consisting of indium (In), gallium (Ga), aluminum (Al), tin (Sn) and antimony (Sb);
- a silver (Ag) layer formed on the first transparent dielectric layer;
- a metal silver-diffusion barrier layer formed on the silver layer, for suppressing diffusion of silver into the overlaying layer wherein the metal silver-diffusion barrier layers are formed of at least one of copper (Cu) and titanium (Ti); and
- a second transparent dielectric layer formed on the metal silver-diffusion barrier layer with at least one metal oxide selected from the group consisting of titanium oxide ($TiO_2$), zinc oxide (ZnO), indium oxide ($In_2O_3$), tin oxide ($SnO_2$) and cadmium oxide (CdO), or material obtained by doping the metal oxides with at least one metals selected from the group consisting of indium (In), gallium (Ga), aluminum (Al), tin (Sn) and antimony (Sb);

a second stack of a silver layer, a metal silver-diffusion barrier layer, a third transparent dielectric layer; and a third stack of a silver layer, a metal silver-diffusion barrier layer and a fourth transparent dielectric layer;
wherein said second and third stacks are consecutively formed on the second transparent dielectric layer of the first stack.

16. The optical filter of claim 15, wherein the thickness of the silver layers is in the range of 30 to 500 Å.

17. The optical filter of claim 15, wherein the thickness of the metal silver-diffusion barrier layers is in the range of 10 to 100 Å.

* * * * *